(12) United States Patent
Delfino et al.

(10) Patent No.: US 8,491,981 B2
(45) Date of Patent: *Jul. 23, 2013

(54) COMPOSITE LAMINATED PRODUCT

(75) Inventors: Antonio Delfino, Grolley (CH);
Jean-Paul Meraldi, Zurich (CH);
François Pozo, Fribourg (CH)

(73) Assignees: Michelin Recherche et Technique S.A.,
Granges-Paccot (CH); Compagnie Generale des Etablissements Michelin,
Clermont-Ferrand (FR)

( * ) Notice: Subject to any disclaimer, the term of this patent is extended or adjusted under 35 U.S.C. 154(b) by 152 days.

This patent is subject to a terminal disclaimer.

(21) Appl. No.: 12/678,260

(22) PCT Filed: Sep. 8, 2008

(86) PCT No.: PCT/EP2008/007315
§ 371 (c)(1),
(2), (4) Date: Jun. 28, 2010

(87) PCT Pub. No.: WO2009/033619
PCT Pub. Date: Mar. 19, 2009

(65) Prior Publication Data
US 2010/0260967 A1     Oct. 14, 2010

(30) Foreign Application Priority Data
Sep. 14, 2007 (FR) ..................... 07 06490

(51) Int. Cl.
*B32B 5/12* (2006.01)
*B32B 7/00* (2006.01)
*B32B 1/00* (2006.01)
*B32B 3/12* (2006.01)
*B60C 7/00* (2006.01)

(52) U.S. Cl.
USPC ............ 428/113; 428/119; 428/178; 152/302

(58) Field of Classification Search
USPC ......................................... 428/113, 119, 178
See application file for complete search history.

(56) References Cited

U.S. PATENT DOCUMENTS

| 124,929 A | 3/1872 | Beitel |
| 159,385 A | 2/1875 | Brosius |

(Continued)

FOREIGN PATENT DOCUMENTS

| DE | 75 467 | 12/1892 |
| DE | 202 07 473 | 8/2002 |

(Continued)

OTHER PUBLICATIONS

Office Action dated Nov. 7, 2012 issued in related U.S. Appl. No. 12/933,647.

(Continued)

*Primary Examiner* — Maria Veronica Ewald
*Assistant Examiner* — Nathan Van Sell
(74) *Attorney, Agent, or Firm* — Cozen O'Connor

(57) ABSTRACT

Composite laminated product (1) that forms a deformable cellular structure includes an upper band (2) and a lower band (3) both oriented in the same main direction (X) between the two bands (2, 3) and connecting the latter, a series extends in the direction X, of cylinders (4) referred to as connection cylinders. The connection cylinders (4) are non-touching in the direction X and having their generatrix oriented along an axis Y perpendicular to the direction X. The connection cylinders are composite cylinders including fibers embedded in a resin matrix. Such a laminated product can be used as an elastic beam having a high resistance to flexural/compressive stresses and having a high endurance to such repeated or alternated stresses, in particular as a shear band in a non-pneumatic resilient wheel.

19 Claims, 6 Drawing Sheets

U.S. PATENT DOCUMENTS

| | | | |
|---|---|---|---|
| 739,053 A | 9/1903 | Biava | |
| 772,239 A | 10/1904 | Keil | |
| 891,169 A | 6/1908 | Hilger | |
| 1,002,003 A | 8/1911 | Simonson et al. | |
| 1,101,702 A | 6/1914 | Lakoff | |
| 1,126,631 A | 1/1915 | Haeppner | |
| 1,233,722 A | 7/1917 | Smith | |
| 1,337,445 A | 4/1920 | Drabek | |
| 1,388,820 A | 8/1921 | Nucera | |
| 1,451,517 A | 4/1923 | Smith | |
| 1,680,961 A | 8/1928 | Van Putten et al. | |
| 2,206,230 A | 7/1940 | Maccabee | |
| 2,400,047 A | 5/1946 | Itscovich | |
| 3,439,027 A | 4/1969 | Patton et al. | |
| 3,598,275 A * | 8/1971 | Francois | 220/675 |
| 3,771,592 A * | 11/1973 | Sayers | 165/10 |
| 4,167,598 A * | 9/1979 | Logan et al. | 428/34.1 |
| 4,471,827 A * | 9/1984 | Czapar | 152/320 |
| 5,118,555 A * | 6/1992 | Horovitz | 428/178 |
| 5,343,916 A * | 9/1994 | Duddey et al. | 152/5 |
| 5,547,737 A * | 8/1996 | Evans et al. | 428/178 |
| 5,800,643 A | 9/1998 | Frankowski | |
| 5,888,608 A * | 3/1999 | Tsai | 428/105 |
| 7,143,564 B2 * | 12/2006 | Renck | 52/783.17 |
| 2002/0007022 A1 * | 1/2002 | Oosedo et al. | 525/527 |
| 2002/0124929 A1 | 9/2002 | Rhyne et al. | |
| 2004/0012246 A1 | 1/2004 | Rhyne et al. | |
| 2004/0069385 A1 | 4/2004 | Timoney et al. | |
| 2004/0159385 A1 | 8/2004 | Rhyne et al. | |
| 2008/0241443 A1 * | 10/2008 | Liu et al. | 428/34.1 |
| 2010/0193097 A1 * | 8/2010 | McNier et al. | 152/311 |
| 2010/0307653 A1 * | 12/2010 | Delfino et al. | 152/302 |

FOREIGN PATENT DOCUMENTS

| | | |
|---|---|---|
| EP | 1 359 028 | 11/2003 |
| EP | 1 378 377 | 1/2004 |
| FR | 581 827 | 12/1924 |
| FR | 2 271 044 | 12/1975 |
| FR | 2 297 144 | 8/1976 |
| FR | 2921011 A1 * | 3/2009 |
| GB | 21272 | 0/1913 |
| GB | 857439 | 12/1960 |
| GB | 2 177 355 | 1/1987 |
| JP | 5-077605 | 3/1993 |
| JP | 39-23073 | 5/2007 |
| JP | 2007-112243 | 5/2007 |
| JP | 2008-105644 | 5/2008 |
| KR | 10 1998 08492 | 12/1998 |
| WO | WO 2007/137858 | 12/2007 |
| WO | WO 2009/005945 | 1/2009 |
| WO | WO 2009115254 A1 * | 9/2009 |

OTHER PUBLICATIONS

Office Action dated Oct. 9, 2012 issued in related U.S. Appl. No. 12/933,673.

Office Action dated Jun. 27, 2012 issued in related U.S. Appl. No. 12/678,267.

International Search Report dated Oct. 21, 2008 issued in International Application No. PCT/US2008/066082.

Office Action dated Mar. 5, 2013 issued in related U.S. Appl. No. 12/933,673.

* cited by examiner

COMPOSITE LAMINATED PRODUCT

RELATED APPLICATIONS

This is a U.S. national stage under 35 USC §371 of application No. PCT/EP2008/007315, filed on Sep. 8, 2008.

This application claims the priority of French application Ser. No. 07/06490 filed Sep. 14, 2007, the entire content of which is hereby incorporated by reference.

FIELD OF THE INVENTION

The present invention relates to laminated products, that is to say to products made of several layers or bands of planar or non-planar form, which are joined together, for example of the cellular or honeycomb type.

The invention relates more particularly to composite laminated products, all or part of which is constituted of fibres coated in a resin matrix and the specific geometric shape of which makes it possible to obtain a deformable cellular structure that can be used as a beam that is resistant to flexural/compressive stresses.

The invention also relates to tires or resilient (flexible) wheels for motor vehicles of the "non-pneumatic" type: that is to say that do not require inflation gases such as air in order to assume their usable form.

BACKGROUND OF THE INVENTION

Non-pneumatic flexible wheels or tires are well known to a person skilled in the art. They have been described in a great number of patent documents, for example in patents or patent applications EP 1 242 254 (or U.S. Pat. No. 6,769,465), EP 1 359 028 (or U.S. Pat. No. 6,994,135), EP 1 242 254 (or U.S. Pat. No. 6,769,465), U.S. Pat. No. 7,201,194, WO 00/37269 (or U.S. Pat. No. 6,640,859), WO 2007/085414.

Such non-pneumatic tires, when they are associated with any rigid mechanical element intended to provide the connection between the flexible tire and the hub of a wheel, replace the assembly constituted by the pneumatic tire, the rim and the disc such as are known on most current road vehicles.

In particular, the aforementioned patent U.S. Pat. No. 7,201,194 describes a non-pneumatic, structurally supported (without internal pressure) tire, which has the main feature of including a reinforced annular band that supports the load on the tire and a plurality of support elements or spokes, having very low stiffness in compression, which operate in tension to transmit the forces between the annular band and the wheel hub.

This annular band (or shear band) comprises two membranes, formed from essentially inextensible cords that are coated with natural or synthetic rubber, which membranes are separated by a shear layer that is itself made of rubber. The operating principle of such a band is that the shear modulus of the shear layer is very substantially lower than the tensile modulus of the two membranes, while being sufficient to be able to correctly transmit the forces from one membrane to the other and to thus make said band work in shear mode.

By virtue of this annular band, it is possible to manufacture non-pneumatic wheels or tires capable of running in severe or harsh conditions without any risk of puncture and without the drawback of having to maintain an air pressure inside the tire.

Moreover, compared with the non-pneumatic tires of the prior art, a ground contact pressure which is more uniformly distributed, hence better working of the tire, an improved road holding and improved wear resistance are obtained here.

However, such a rubber shear band is not without drawbacks.

Firstly, at the customary operating temperatures, for example between −30° C. and +40° C., it is relatively hysteretic, that is to say that some of the energy supplied for rolling is dissipated (lost) in the form of heat. Next, for significantly lower operating temperatures, such as those that can be found, for example in geographical areas of polar type, typically below −50° C. or even less, it is well known that rubber rapidly becomes brittle, frangible and therefore unusable. Under such extreme conditions, it is moreover understood that temperature fluctuations that are more or less sizable and rapid, combined, for example, with relatively high mechanical stresses, may also lead to adhesion problems between the two membranes and the shear layer, with a risk of localized buckling of the shear band level with the membranes and an endurance that is in the end degraded.

SUMMARY OF THE INVENTION

During their research, the Applicants have found a novel laminated product that can be used, in particular, as a shear band in non-pneumatic tires or wheels as described above, which makes it possible to at least partly overcome the aforementioned drawbacks.

Thus, according to a first aspect, the present invention relates to a composite laminated product that forms a deformable cellular structure, characterized in that it comprises at least:

an upper band and a lower band both oriented in the same main direction X;

between the two bands and connecting the latter, a series that extends in the direction X, of cylinders referred to as connection cylinders, said connection cylinders being non-touching in the direction X and having their generatrix oriented along an axis Y perpendicular to the direction X, and in that said connection cylinders are composite cylinders comprising fibres embedded in a resin matrix.

This laminated product of the invention has a highly aerated deformable cellular structure, which has proved to exhibit, unexpectedly, a high resistance to flexural and/or compressive stresses and a high endurance to such repeated or alternated stresses. It has the advantage of being non-hysteretic.

Moreover, according to one particularly preferred embodiment, when the connection cylinders and the upper and lower bands are, in particular, constituted of a composite material based on glass fibres and/or carbon fibres that are embedded in a thermosetting resin of polyester or vinyl ester type, this laminated product has furthermore proved, not only capable of withstanding extremely low temperatures but also capable of being used in a very wide range of temperatures typically extending from −250° C. up to +150° C.

Such a laminated product can be used as a structural element of any finished product, and also any finished product comprising a laminated product in accordance with the invention.

Such a laminated product can be particularly used as a reinforcing element of a non-pneumatic wheel or tire, in particular as a shear band of such a tire or of such a wheel.

BRIEF DESCRIPTION OF THE DRAWINGS

A detailed description and exemplary embodiments of the invention are presented below in connection with figures relating to these examples which schematically show (without keeping to a specific scale):

- in cross section, a laminated product according to the invention oriented along a main direction X which is rectilinear (FIG. 1 and FIG. 4);
- in cross section, a laminated product according to another embodiment of the invention, oriented along a main direction X which follows a curved line (FIG. 2);
- a perspective view of the cross sections of the preceding FIG. 1 and FIG. 4 (FIG. 3 and FIG. 5, respectively);
- in radial section, two examples of a non-pneumatic resilient wheel comprising a laminated product according to the invention (FIG. 6 and FIG. 7); and
- a complete perspective view of an example of a non-pneumatic resilient wheel comprising a laminated product according to the invention (FIG. 8).

DEFINITIONS

Figure 1:
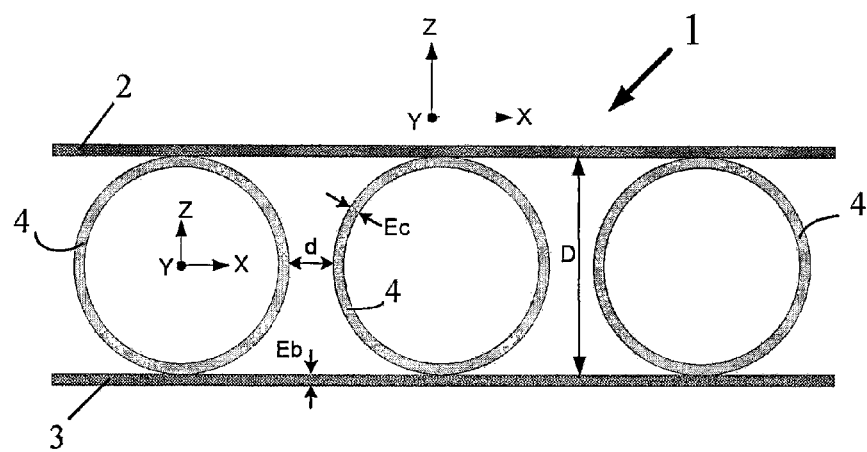

In the present description, unless otherwise stated, all the percentages (%) indicated are % by weight.

Moreover, in the present application, the following definitions apply:

"composite", when referring to any material or object: a material or object comprising short or continuous fibres that are coated in a resin matrix;

"layer" or "band": a sheet or any other element having a relatively small thickness compared to its other dimensions, this layer possibly or possibly not being of homogenous or cohesive nature;

"cylinder": any hollow (i.e. bottomless) cylinder in the broadest sense of the term, that is to say any object of cylindrical shape having any straight (orthonormal) cross section, that is to say the outline of which defines a closed line without a point of inflexion (the case, for example, for a circular, oval or elliptical cross section) or with point(s) of inflexion; according to such a definition, it will be understood that the terms such as tube, cylindrical tube, cylindrical tube portion, tubular element, tubular column, cylindrical element all denote said "cylinder";

"unidirectional fibres": a set of fibres that are essentially parallel to one another, that is to say oriented along one and the same axis;

"non-pneumatic", when referring to a wheel or a tire: a wheel or a tire designed in order to be capable of bearing a substantial load without inflation pressure, that is to say that does not require an inflation gas such as air in order to assume its usable form and support the load;

"oriented along an axis or in a direction" when referring to any element such as a band, a fibre or other longilineal reinforcing element: an element that is oriented substantially parallel to this axis or this direction, that is to say that makes, with this axis or this direction, an angle that does not deviate by more than 10 degrees (that is to say zero or at most equal to 10 degrees), preferably not by more than 5 degrees;

"oriented perpendicular to an axis or a direction", when referring to any element such as a band, a fibre or another longilineal reinforcing element: an element which is oriented substantially perpendicular to this axis or this direction, that is to say that makes, with a line that is perpendicular to this axis or this direction, an angle that does not deviate by more than 10 degrees, preferably not by more than 5 degrees;

"oriented radially", when referring to a wheel (or tire) element: oriented in any direction that passes through the axis of rotation of the wheel (or of the tire) and substantially perpendicular to this direction, that is to say that makes, with this direction, an angle that does not deviate by more than 10 degrees, preferably not more than 5 degrees;

"oriented circumferentially", when referring to a wheel (or tire) element: oriented substantially parallel to the circumferential direction of the wheel (or of the tire), that is to say that makes, with this direction, an angle that does not deviate by more than 10 degrees, preferably by not more than 5 degrees;

"laminated product", within the meaning of the International Patent Classification: any product comprising at least two layers or bands, of planar or non-planar form, which are connected together; the expression "joined" or "connected" should be interpreted in a broad manner so as to include all the joining or assembling means, for example by bonding, nailing, riveting or bolting;

"resin": any synthetic resin, of thermoplastic type or of thermosetting type (also referred to, for the latter, as curable, polymerizable or crosslinkable), and by extension any composition or formulation based on said resin and comprising, in addition, one or more additives such as, for example, a curing agent.

DETAILED DESCRIPTION OF THE DRAWINGS

The composite laminated product of the invention (1) has the main feature of comprising at least (with reference to FIG. 1, FIG. 2 and FIG. 3):

- an upper band (2) and a lower band (3) both oriented in the same main direction X;
- between the two bands (2, 3) and connecting the latter, a series that extends in the direction X, of connection cylinders (4) that are non-touching in the direction X and having their generatrix oriented along an axis Y perpendicular to the direction X (at the very least in the undeformed structure).

These connection cylinders have, in addition, the feature of being composite cylinders, that is to say of comprising fibres embedded in (or coated with, the two being considered to be synonyms) a resin matrix.

The laminated product of the invention thus forms a hollow, very honeycombed structure that may be described as "cellular" in the sense that no other material is necessary between these two bands and the cylinders (hollow and bottomless, by definition).

This deformable cellular structure can be used as a (planar or non-planar) elastic beam having a high resistance to flexural/compressive stresses and high endurance to such repeated or alternated stresses, by virtue of its ability to generate a deformation comparable to shear between its two bands under the action of various tensile, flexural or compressive stresses.

Figure 2:
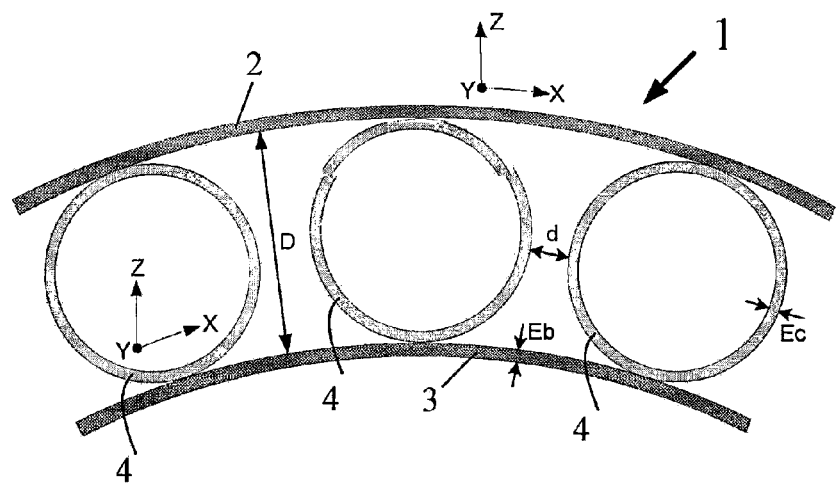
Figure 3:
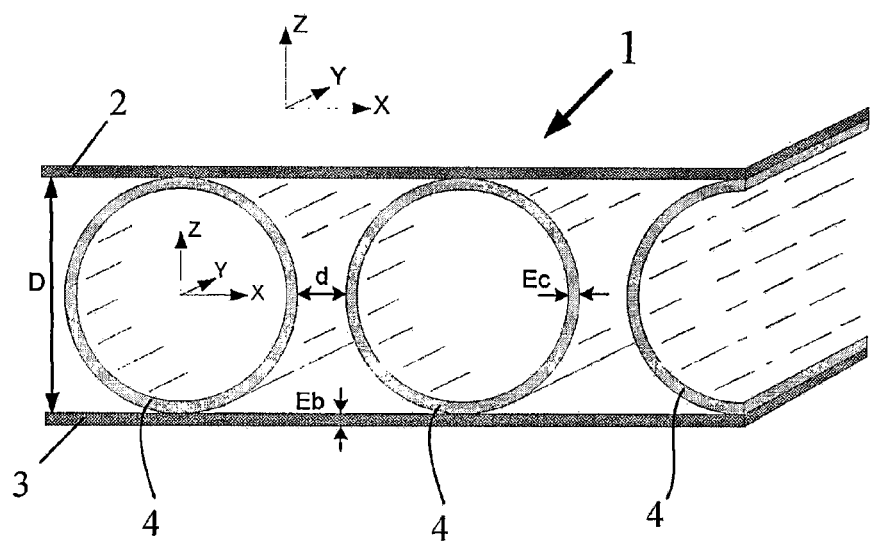

The main direction X may be rectilinear as represented in FIG. 1 or in FIG. 3 (perspective cross section corresponding to the cross section from FIG. 1) or else follow a curved line as represented in FIG. 2.

Owing to its connection cylinders (4) made of a composite material, the laminated product of the invention has a high deformation potential in a purely elastic domain. The connection cylinders (4) are particularly durable since they exhibit a purely elastic behaviour up to rupture, without plastic deformation, contrary to, for example, a metallic structure which experiences, under high deformation, plastic behaviour, i.e. irreversible behaviour, that is damaging, in a known manner, to the endurance. This advantageous property also applies to the bands (2, 3) when the latter are themselves also made from a fibres/resin composite material.

Compared with a metal structure, a structure is thus obtained that is more durable, substantially lighter (density of the composite close to 2) and also corrosion resistant.

The fibres of the connection cylinders (4) may be continuous fibres or short fibres, it is preferred to use continuous fibres. For a better strength of the cylinders, these fibres are more preferably unidirectional and oriented circumferentially in a plane perpendicular to the axis Y.

These connection cylinders (4) essentially operate by bending. Depending on the circumferential axis of their reinforcing fibres, they have a tensile modulus (ASTM D 638) and a flexural modulus (ASTM D 790) which are preferably greater than 15 GPa, more preferably greater than 30 GPa, especially between 30 and 50 GPa.

The invention also applies to the cases where the two bands (2, 3) could be constituted of a material other than that of the cylinders, for example made of metal or of a polymer.

According to one preferred embodiment, the upper band (2) and lower band (3) (sometimes known as "membranes" or rather "skins" by a person skilled in the art in the field of composite laminates) are composite bands that also comprise fibres embedded in a resin matrix. Thus, the whole of the base structure, constituted by the two bands (2, 3) and their plurality of connection cylinders (4) is made from a composite material. Preferably, these fibres of the bands (2, 3) are continuous fibres; more preferably, these continuous fibres are unidirectional, oriented parallel to the main direction X so that the bands have a maximum tensile strength in the main direction X. In this direction X, the two bands (2, 3) have a tensile modulus (ASTM D 638) which is preferably greater than 15 GPa, more preferably greater than 30 GPa (for example, between 30 and 50 GPa).

The connection cylinders (4) and/or the composite bands (2, 3) above may be constituted of a single filamentary layer or of several superposed elementary filamentary layers, the fibres of which are all oriented in the main direction X. Inserted into this multilayer structure may be one or more other additional layers of crossed threads, especially that are oriented along the axis Y (generatrix of the cylinders), in order to reinforce the structure laterally and thus, according to a term recognized in the field of composites, to balance the total structure.

According to another preferred embodiment, the connection cylinders (4) have a diameter D which is substantially constant in a direction Z referred to as the radial direction, normal to the direction X and to the axis Y, so as to keep the upper band (2) and lower band (3) substantially (i.e. approximately) equidistant.

According to another possible embodiment of the invention, the cylinders (4) may also have a diameter D which is linearly variable in the main direction X, when a structure is desired in which the distance between the two bands is capable of gradually varying along the main axis X.

As already indicated, as the definition of the cylinders (4) is not limited to cylinders having a circular straight cross section, the term "diameter" should be considered here, broadly, as the dimension of the cylinder (thickness included) in the radial direction Z.

The person skilled in the art will know how, as a function of the particular applications targeted, to adjust the particular dimensions of the connection cylinders (4) and bands (2, 3), and their relative arrangement, to the dimensions of the finished product intended to incorporate the laminated product of the invention. The dimension D, for example, makes it possible to adjust the flexural stiffness of the connection cylinders.

An essential feature of the laminated product of the invention (1) is that these connection cylinders (4) are non-touching in the main direction X so that they can deform and operate by bending.

Preferably, the ratio d/D is between 0.10 and 0.50, d representing the average distance d, measured in the direction X, between two consecutive connection cylinders, as illustrated in FIGS. 1 and 2. The expression "average distance" is understood to mean an average calculated from all the connection cylinders (4) present in the laminated product (1). If d/D is less than 0.10, there is a risk of being exposed to a certain lack of flexibility in shear whereas if d/D is greater than 0.50, a lack of uniformity of the flexural deformation may appear. For these reasons, the ratio d/D is more preferably within a range of around 0.15 to 0.40.

It will be noted, in this regard, that in FIG. 6, which diagram will be commented on later, the connection cylinders (15) and also the wheel spokes (12) have been represented in a relatively reduced number compared to the preferred embodiments of the invention, this for the simple purpose of simplifying the figure.

As preferred examples of structures of laminated products (1) according to the invention, especially when the main direction X of the latter is not rectilinear but curved or circumferential (FIG. 2), at least any one, more preferably still all of the following features is (are) met:
 a diameter D which is between 10 and 100 mm;
 an average distance d which is between 1 and 50 mm;
 a width $L_b$ of the bands and a width $L_c$ of the cylinders, both measured in a direction parallel to the axis Y, which are each between 5 and 200 mm;
 a thickness $E_b$ of the bands and a thickness Ec of the cylinders (thicknesses measured in the radial direction Z) which are each between 0.25 and 3 mm.

These preferred features correspond particularly to the case where the laminated product of the invention is used as a shear band in a non-pneumatic wheel of standard size, as will be expanded upon in greater detail further on.

More preferably, for the reasons indicated above, at least any one, more preferably still all of the following features is (are) met:
 a diameter D which is between 15 and 45 mm;
 an average distance d which is between 1.5 and 40 mm (especially between 3 and 40 mm, more particularly between 5 and 15 mm);
 a width $L_b$ of the bands and a width $L_c$ of the cylinders which are each between 20 and 100 mm;
 a thickness $E_b$ of the bands and a thickness $E_c$ of the cylinders which are each between 0.5 and 2 mm.

Of course, values of D of less than 10 mm or greater than 100 mm remain possible depending on the envisaged radii of curvature or diameters of the wheels.

Thus, as other possible preferred examples of structures of laminated products according to the invention, at least any one, more preferably still all of the following features is (are) met:
 a diameter D which is between 10 and 100 cm, especially between 15 and 45 cm;
 an average distance d which is between 1 and 50 cm, especially between 1.5 and 40 cm;
 a width $L_b$ of the bands and a width $L_c$ of the cylinders, both measured in a direction parallel to the axis Y, which are each between 5 and 200 cm, especially between 20 and 100 cm;

a thickness $E_b$ of the bands and a thickness $E_c$ of the cylinders (thicknesses measured in the radial direction Z) which are each between 0.25 and 3 cm, especially between 0.5 and 2 cm.

The various constituent parts of the composite laminated product (1) of the invention, in particular the connection cylinders (4) and the upper band (2) and lower bend (3) which constitute the base parts of which, may be connected directly by virtue of chemical, physical or mechanical fastening means. As examples of such fastening means, mention will be made, for example, of adhesives, rivets, bolts, staples, and various stitchings or bindings. The fastening means may be made of various materials, such as metal, metal alloy, plastic or else made from a composite (for example based on glass or carbon fibres).

For a better anchoring, the connection cylinders (4) may also partially penetrate into the upper band (2) and/or lower band (3) to which they are connected.

According to another possible embodiment, the connection cylinders (4) may be connected indirectly to the upper band (2) and lower band (3), that is to say by means of intermediate assembly parts. These intermediate parts or "inserts" may have various geometric shapes, for example in the shape of a parallelepiped, a dovetail, in the shape of "I", of "T" or of "U"; they may themselves be fastened to the base parts (bands and connection cylinders) by fastening means as described above. Use may especially be made of such "inserts" or reinforcing parts each time that the forces endured are too high; these inserts possibly lowering the stresses transmitted to the composite structure to acceptable levels. These inserts are, for example, made of metal, metal alloy, plastic or else a composite (for example made of glass or carbon fibres embedded in a resin).

Figure 4:
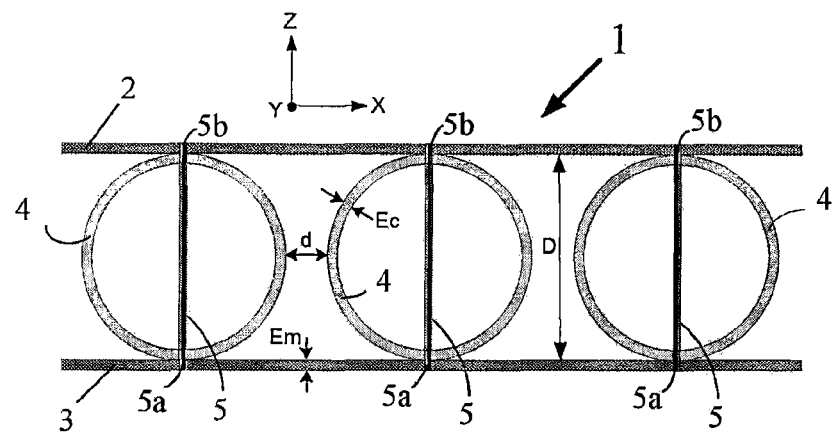
Figure 5:
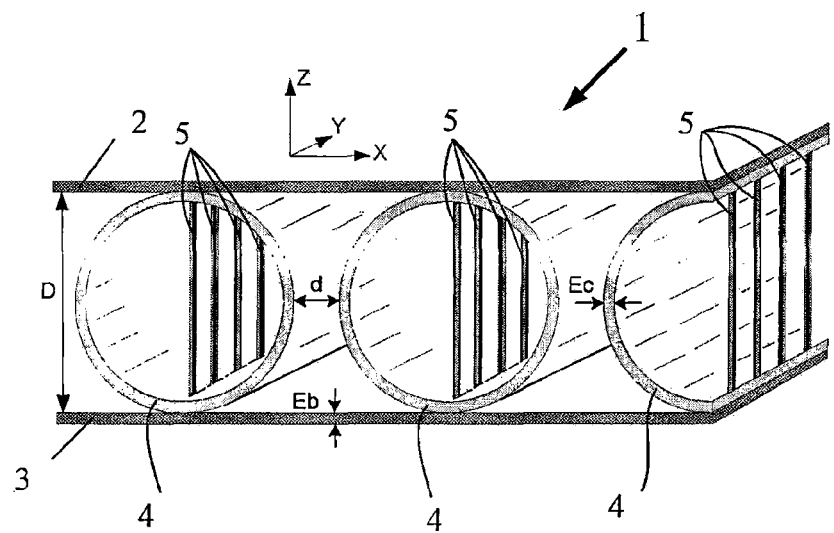

According to another particularly preferred embodiment of the invention, the connection cylinders (4), for at least some of them or more preferably for all of them, are reinforced by a reinforcing element referred to as a "radial cylinder reinforcement" (5) that passes through them completely along their diameter, parallel to a radial direction Z which is perpendicular to the main direction X and to the generatrix Y of the connection cylinders, as illustrated, for example, in FIGS. 4 and 5.

The radial cylinder reinforcement (5) operates as a beam which prevents the deformation of the cylinders (4) perpendicular to their axis Y (generatrix). Due to its stiffness in tension and in compression, it prevents the laminated product (1) from buckling when the composite structure is subjected to particularly severe bending.

Having any straight cross section, it preferably has a small thickness relative to its other dimensions, it may have various longilineal forms such as thread or monofilament, film or tape forms.

Its diameter $\phi$ when it is a monofilament or, if it deviates from a circular straight cross section, its smallest lateral dimension measured in the main direction X, is preferably between 0.25 and 3 mm, more preferably between 0.5 and 1.5 mm.

Of course, its length cannot be less than the dimension D of the cylinders, it is preferably greater than D. Thus, according to one preferred embodiment, the radial cylinder reinforcement (5) passes completely through, in the direction Z, the connection cylinder so as to be anchored in the upper and lower bands; such an embodiment is illustrated in FIG. 4 where it can be seen that the ends (5a, 5b) of each radial cylinder reinforcement (5) penetrate into the upper band (2) and lower band (3).

According to one more preferred embodiment, when inserts or intermediate assembly parts are used in order to assemble the cylinder with the two bands, the radial cylinder reinforcement (5) passes completely through, in the direction Z, the connection cylinder (4) and the upper and lower bands (2, 3) so as to be anchored in these inserts or even beyond when that is appropriate.

According to another more preferred embodiment, the radial cylinder reinforcement (5) is itself made of a composite material and comprises unidirectional continuous fibres embedded in a resin matrix.

According to another more preferred embodiment, the radial cylinder reinforcement (5) is constituted by a series of discrete (elementary) reinforcements oriented parallel to the radial direction Z, said series being aligned along the generatrix Y of the connection cylinders, as illustrated in FIG. 5 which represents a perspective cross section of the laminated product (1) of the invention.

These discrete reinforcements (5) are preferably monofilaments of any, especially circular, straight cross section. The density of reinforcements (5) measured along the axis Y is preferably within a range from 5 to 50, more preferably from 10 to 40, for example from 15 to 35 reinforcements per dm of width (measured along Y) of connection cylinder.

Throughout the present description, unless otherwise stated, the term "fibre" applies to any type of reinforcing fibre, that can be used as long as the latter is compatible with its resin matrix. Such a fibre is, for example, chosen from the group constituted by polyvinyl alcohol fibres, aromatic polyamide (or "aramid") fibres, polyamide-imide fibres, polyimide fibres, polyester fibres, aromatic polyester fibres, polyethylene fibres, polypropylene fibres, cellulose fibres, rayon fibres, viscose fibres, polyphenylene benzobisoxazole (or "PBO") fibres, polyethylene naphthenate ("PEN") fibres, glass fibres, carbon fibres, silica fibres, ceramic fibres, and mixtures of such fibres.

Use is preferably made, especially for an application at very low temperature, of the fibres chosen from the group constituted by glass fibres, carbon fibres and mixtures of such fibres. More preferably still, glass fibres are used.

The resin used is a preferably thermosetting resin. It is, for example, a resin that can be crosslinked by ionizing radiation, such as for example ultraviolet-visible radiation that emits, preferably in the spectrum ranging at least from 300 nm to 450 nm, a beam of accelerated electrons or of X-rays. A composition may also be chosen that comprises a resin that can be crosslinked by a peroxide, the subsequent crosslinking possibly then being carried out, when the time comes, by means of a heat input, for example by the action of microwaves. Preferably, a composition of the type that can be cured by ionizing radiation is used, the final polymerization possibly being triggered and controlled easily using an ionizing treatment, for example of UV or UV/visible type.

The resin used, in the thermoset state, has a tensile modulus (ASTM D 638) which is preferably at least equal to 2.3 GPa, more preferably greater than 2.5 GPa, especially greater than 3.0 GPa. Its glass transition temperature ($T_g$), measured by DSC, is preferably greater than 130° C., more preferably greater than 140° C.

As a crosslinkable resin, use is more preferably made of a polyester resin (i.e. based on an unsaturated polyester) or a vinyl ester resin. More preferably still, a vinyl ester resin is used.

It has been observed, surprisingly, that a vinyl ester resin survived better than the others at extremely low temperatures. A simple test makes it possible to measure whether the flexural strength of a glass fibre/vinyl ester resin composite is substantially increased at very low temperature. This test consists in making a loop with a composite monofilament (for example having a diameter of 1 mm) and decreasing the radius of curvature until rupture (clearly visible to the naked eye) of the outer part of the monofilament which is in tension. It is then seen, unexpectedly, that the minimum radius achieved becomes smaller when the loop of monofilament has been submerged, just before, in liquid nitrogen (−196° C.). In the thermal quenching or immersion test in liquid nitrogen, it is also possible to test the resin as is, favouring the resins which do not crack during such a test.

According to one particularly preferred embodiment, the connection cylinders and their upper and lower bands are entirely constituted of glass fibres and/or carbon fibres embedded in a vinyl ester resin matrix.

Vinyl ester resins are well known in the field of composite materials. Without this definition being limiting, the vinyl ester resin is preferably of the epoxy vinyl ester type. More preferably, use is made of a vinyl ester resin, especially of the epoxide type, which, at least in part, is based on (that is to say grafted to a structure of the type) novolac (also referred to as phenoplast) and/or bisphenol, i.e. preferably a novolac, bisphenol or novolac and bisphenol based vinyl ester resin as described, for example, in applications EP 1 074 369 and EP 1 174 250 (or U.S. Pat. No. 6,926,853). An epoxy vinyl ester resin of novolac and bisphenol type has shown excellent results. By way of examples, mention may especially be made of the "ATLAC 590" or "ATLAC E-Nova FW 2045" vinyl ester resins from DSM (both diluted with stirene). Such epoxy vinyl ester resins are available from other manufacturers such as Reichhold, Cray Valley and UCB.

The laminated product of the invention may advantageously be constituted solely of composite parts made of glass fibres embedded in a vinyl ester resin.

For the manufacture of the various composite elements based on fibres and resin that are constituents of the laminated product of the invention, whether these are connection cylinders such as, where appropriate, (lower and upper) bands and/or radial cylinder reinforcements, it is possible to use any suitable process for manufacturing blocks, sheets or else longilineal elements such as monofilaments or tapes.

Such processes are widely known today by a person skilled in the art of composites.

Patent application EP 1 174 250 (or U.S. Pat. No. 6,926, 853) proposed for example, after degassing, to impregnate a rectilinear arrangement of fibres with the liquid resin, to pass the liquid pre-preg through a die that is calibrated in order to impose, for example, a monofilament shape of round cross section or a shape of a tape, to stabilize the monofilament or tape downstream of the die via a substantial solidification of the resin in a UV stabilization chamber, then to wind the solid (stabilized) tape or monofilament onto a support of suitable shape, finally to cure the whole assembly in a pressurized mould in order to solidify the assembly and guarantee a high shear strength.

Patent application WO 2007/085414 proposed, as an alternative, to directly wind, continuously and in several layers, onto a support that dictates the final shape of the composite block, the fibres embedded in their resin in the liquid state throughout the entire manufacturing operation, for direct formation of a continuous ring on said support. Once the "liquid" composite ring is thus formed, the liquid resin is subjected to an at least partial polymerization, for example using UV radiation or a heat treatment in order to stabilize and solidify, at least in part, said ring before separating it from its support. The thus stabilized composite block in which the resin composition is then, at least in part, in the solid phase may then be easily handled, stored as is or treated immediately in order to finish polymerizing the resin (final curing or crosslinking). Thus, the final curing operation may be carried out under simple atmospheric pressure, "out of mould" (or in "open mould" according to the recognized terminology).

The composite laminated product of the invention described previously may constitute an intermediate stage of the manufacture of a finished product or object which is or is not laminated in its final form.

Its structure, equivalent to a honeycomb type structure, opens up a very wide range of possible applications for it, which covers, for example, general mechanics, sports and leisure, building and public works, wire transport, roads, rail, aerial or spatial transport, and motor vehicles.

This laminated product is constituted of elastic materials that retain their properties over a very wide range of temperatures; unexpectedly, it has proved capable of emulating, over this very wide range of temperatures, the shear deformation of an elastomer of a shear band as described in the prior art.

Thus, the composite laminated product of the invention can especially be used in non-pneumatic tires or wheels of all types of land based or non-land based motor vehicles, in particular vehicles intended to face severe or harsh rolling conditions, or extreme temperatures such as those which could be encountered, for example, by lunar rover vehicles, road transport vehicles, off-road vehicles such as agricultural or civil engineering machines, or any other type of transport or handling vehicles for which the use of an elastomeric material is not possible or is not desired.

Figure 6:
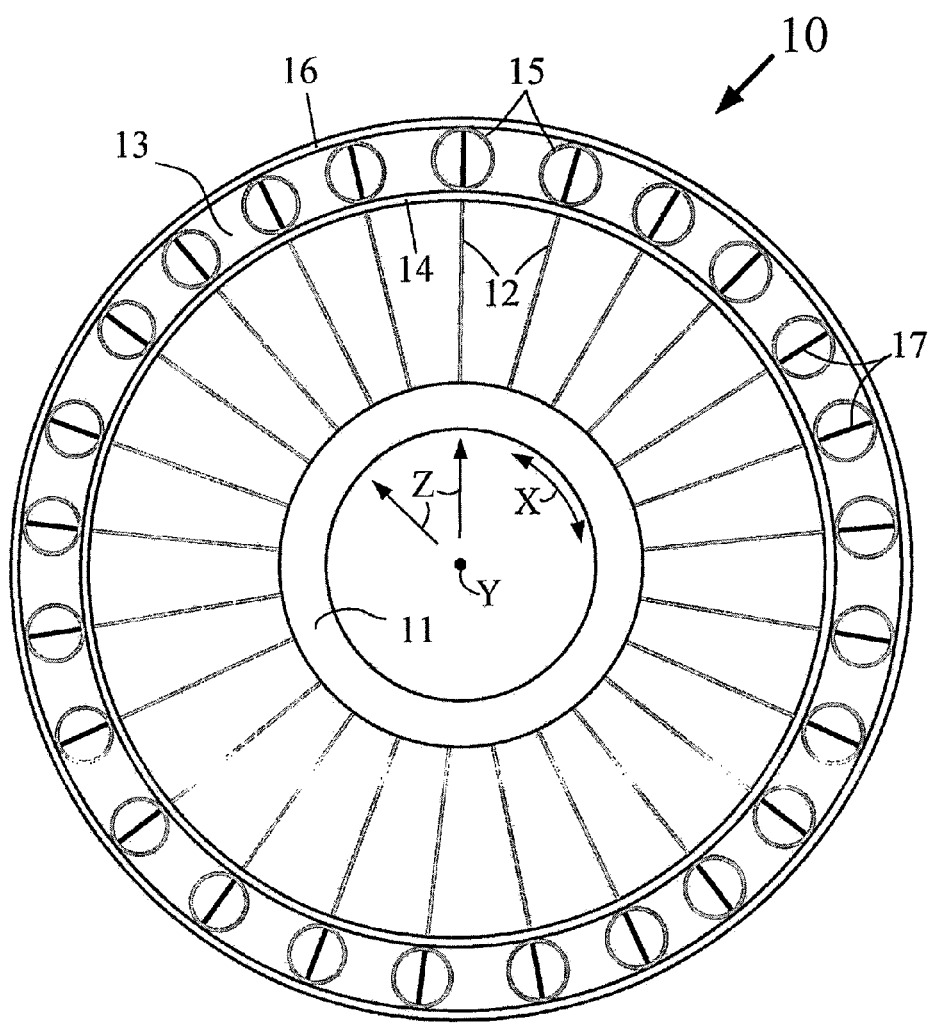

By way of example, FIG. 6 represents, very schematically, a radial cross section (i.e. in a plane perpendicular to the axis of rotation Y of the wheel) of a non-pneumatic resilient wheel (10) that is structurally supported (i.e. owing to a load-bearing structure), the circumferential shear band (13) of which is constituted by a laminated product in accordance with the invention.

This non-pneumatic wheel (10), that defines three perpendicular directions, circumferential (X), axial (Y) and radial (Z), comprises at least:
a hub (11);
an annular band referred to as a shear band (13) comprising at least one inner circumferential membrane (14) and one outer circumferential membrane (16) that are oriented in the circumferential direction X; and
a plurality of support elements (12) that connect the hub (11) to the inner circumferential membrane (14).
Moreover, it has the following features:
the two membranes (14, 16) are connected to one another by means of a series, that extends in the circumferential direction (X), of connection cylinders (15), said connection cylinders (15) being non-touching in the circumferential direction X and having their generatrix oriented in the axial direction Y; and
the connection cylinders (15) are composite cylinders comprising fibres embedded in a resin matrix.

In other words, the axis (generatrix) of the connection cylinders is aligned parallel to the axis of rotation of the wheel, at the very least in the structure of the wheel at rest (not deformed).

In this FIG. 6, in accordance with one particularly preferred embodiment, each cylinder (15) is reinforced by a series of radial cylinder reinforcements (17) oriented radially (along Z), said series being aligned following the generatrix (direction Y) of the cylinders and containing in this direction, by way of example, a density of 5 to 15 threads per dm of cylinder. Each radial cylinder reinforcement (17) passes completely through the connection cylinder (15) along its diameter so as to anchor its two ends in the inner membrane (14) and outer membrane (16).

In this example of a wheel (10), each circumferential membrane (14, 16), having a thickness equal to around 1 mm, is constituted, for example, of two lots of three layers of continuous glass fibres ("Advantex" from Owens Corning; linear density 1200 tex), degassed and impregnated with a vinyl ester resin ("Atlac 590" from DSM+"Irgacure 819" photoinitiator from Ciba) between which a glass fibre weft woven fabric ("E" glass; basis weight 125 g/m$^2$), impregnated with a vinyl ester resin, was added in order to balance the composite assembly. The membrane was obtained by filament winding (tape originating from a nozzle of 0.2×5 mm) at an angle close to zero degrees. After winding (laying pitch of 5 mm) of three elementary layers, the winding was stopped, then the resin-impregnated weft woven fabric was deposited on the third layer, before winding the last three layers of tape on top of the thus inserted weft woven fabric. Then the whole assembly was polymerized under UV radiation, on the winding support. According to the other method of manufacture, it is possible, for example, to continuously wind, as follows: the following layers are successively deposited: layer at 0°, then a layer at −5°, a layer at +5°, a layer at 0°, a layer at +5°; a layer at −5°; and to finish a layer at 0°, all continuously. The layers at +5° and −5° give sufficient lateral cohesion; the final thickness is always the same. Thus prepared, each membrane has, for example, in the direction of its reinforcing fibres, a tensile modulus of the order of 45 GPa.

The connection cylinders (15) having a diameter and thickness respectively equal to around 30 mm and 0.8 mm were prepared as the membranes above, by filament winding in four layers, perpendicular to the axis (generatrix) of the cylinder. After which the whole assembly was polymerized under UV radiation (on the winding support). The connection cylinders have a diameter D that is constant in the radial direction, so as to keep the outer circumferential membrane (16) and inner circumferential membrane (14) substantially equidistant. In the shear band (13) the average distance d, measured in the circumferential direction X, between two consecutive connection cylinders (15) is, for example, around 7 mm.

The radial cylinder reinforcements (17) are, for example, composite monofilaments constituted of glass fibres ("Advantex") coated in a vinyl ester resin ("Atlac E-Nova FW 2045" resin from DSM); seen in cross section, these composite monofilaments comprise very many elementary filaments embedded in a resin which, once polymerized, gives the product the appearance of a single strand. Their diameter φ is equal to around 1 mm. They were prepared in a known manner by pultrusion, as described, for example, in the aforementioned patent application EP 1 174 250. Such composite monofilaments, and also the manufacture thereof, have also been described in patent application EP 1 167 080 (or U.S. Pat. No. 7,032,637) as reinforcing elements for conventional tires of the pneumatic type.

The support elements (12) or "wheel spokes" having a low stiffness in compression, operate in tension to transmit the forces between the annular shear band (13) and the hub (11) of the wheel, as described, for example, in the aforementioned patent U.S. Pat. No. 7,201,194 (see, for example, FIG. 7 to FIG. 11 of the patent). Their thickness is fine relative to that of the membranes, preferably less than 0.5 mm, more preferably less than 0.3 mm.

Owing to their presence, a uniformly distributed ground contact pressure is favoured, hence a better working of the wheel; thus localized points of high pressure, and the risks of sinking or getting stuck in sand which may go with them on unstable ground, are avoided.

These wheel spokes (12) may be made of materials as diverse as metal (or metal alloys), polymers or else hybrid materials, which are reinforced or non-reinforced. As examples, mention may be made of polymers such as polyurethanes, composite materials comprising fibres, especially glass or carbon fibres, coated or impregnated with a resin. The tensile modulus of the materials used is suitable, of course, for the load which will be supported by each wheel spoke. In a known manner, by adjusting the elongatability of the wheel spokes (or that of the materials constituting them), it is possible to adjust the ground imprint of the wheel.

According to one preferred embodiment, especially for use of the wheel at very low temperature, it is possible to use wheel spokes which are themselves made of a composite material, such as for example a woven fabric of glass fibres impregnated with PTFE (polytetrafluoroethylene) or layers of continuous, unidirectional glass fibres embedded in a vinyl ester resin matrix.

It is seen in this FIG. 6 that, in accordance with one preferred embodiment, there is a wheel spoke (12) opposite each connection cylinder (15), each wheel spoke (12) being more preferably substantially aligned, in a radial direction Z, with each radial cylinder reinforcement (17).

For all the composite elements of the wheel described above, the fibre content is, for example, around 70% (i.e. around 30% resin).

For the manufacture of the wheel (10), it is possible to use any suitable process for assembling elements described above, for example by adopting the following consecutive steps:
  manufacture of the two membranes (14, 16);
  positioning of the connection cylinders (15) on an assembly jig;
  fastening, by bonding (for example using an epoxy adhesive) the two membranes (14, 16) to the connection cylinders (15);
  positioning and bonding of the wheel spokes (12);
  for example, the spokes are adjusted to the correct length and bonded at their two ends to composite lugs (inserts) one fitted to the membrane, the other to the metal hub; the lug on the membrane side is both bonded and bolted, whereas on the hub side it is only bolted;
  simultaneous piercing of the shear band (membranes and connection cylinders);
  threading and bonding of the composite monofilaments (17) through the holes made previously.

Preferably, for good effectiveness of the ground contact pressure, the wheel of the invention satisfies the relationship $0.7 \leq Di/De < 1$, more preferably the relationship $0.8 \leq Di/De < 1$, Di being the diameter of the inner circumferential membrane (14) and De being the diameter of the outer circumferential membrane (16). By way of example, Di and De are within a range of around 200 mm to 2000 mm.

As described previously, the connection cylinders (15) may be connected directly to the membranes (14, 16) by virtue of appropriate fastening means already described, or else connected indirectly by means of intermediate assembly parts, especially by virtue of metal, plastic or composite inserts that also have the role of reinforcing the assembly points.

Figure 7:
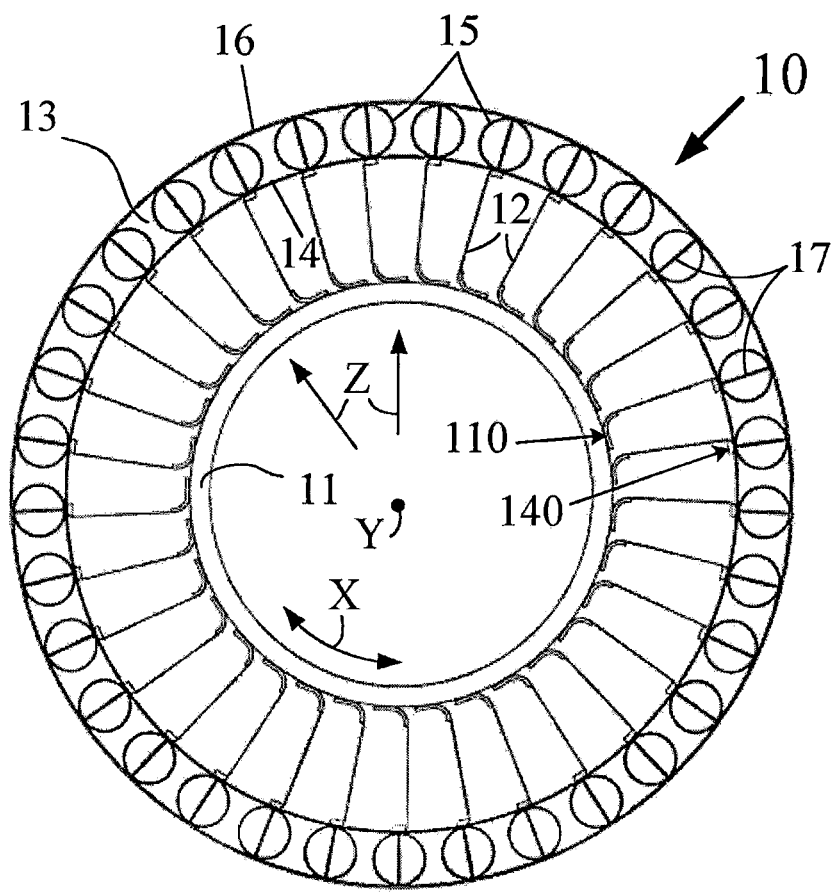

FIG. 7 illustrates another example of a wheel (10) in which the wheel spokes (12), having a very fine thickness (around 0.15 mm) are assembled by means of such inserts (110, 140), on the one hand to the wheel hub (11) and on the other hand to the inner circumferential membrane (14).

The inserts (110) assembling the wheel spokes (12) to the rigid hub (11) are, for example, in the form of half "U" shapes, constituted of a composite material (fibres/resin), especially made of glass fibres/vinyl ester resin, having a thickness equal to around 1 mm. They were, for example, manufactured as indicated previously for the connection cylinders (15), by filament winding in 5 successive layers onto a support having the shape of a flattened cylinder. After UV polymerization, the half U shapes were obtained by cutting the flattened cylinder. The inserts (140) assembling the wheel spokes (12) to the inner circumferential membrane (14) are, for example, of the same thickness but of smaller size, for example in the shape of an "I", themselves made of a composite material such as glass fibres/vinyl ester resin; they were manufactured as indicated previously for the other inserts (110).

Figure 8:
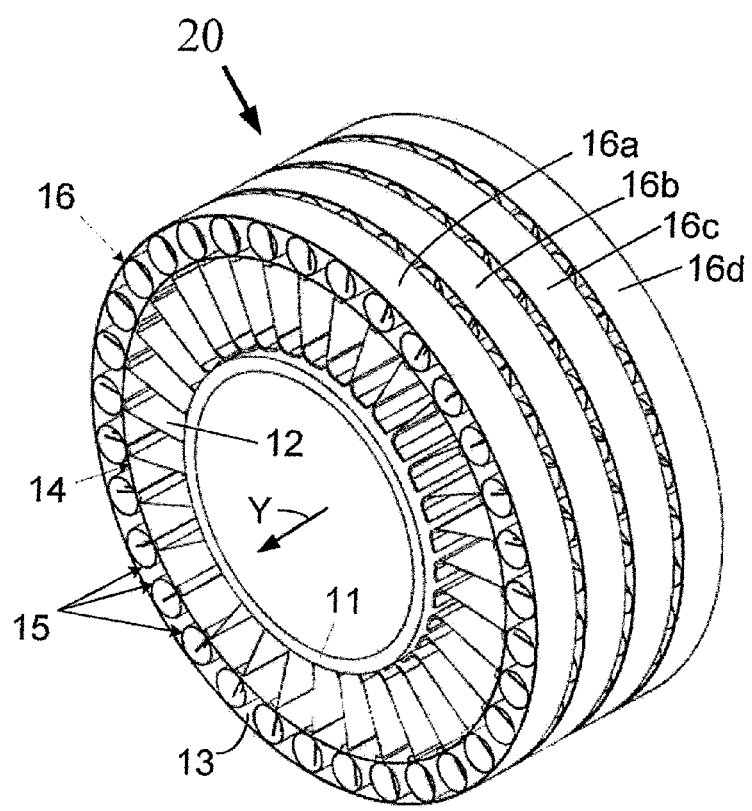

Finally, FIG. 8 shows a perspective view of another example of a non-pneumatic wheel (20), the shear band (13) of which comprises, as it were, several elementary shear bands, placed in parallel radial (i.e. perpendicular to the axial direction Y) planes, each of them being constituted by a laminated product in accordance with the invention. It is seen in this FIG. 8 that each elementary outer circumferential membrane (16*a*, 16*b*, 16*c*, 16*d*) is relatively narrow (axial width equal, for example, to 40 mm, measured along Y) relative to the total axial width of the wheel (for example equal to 200 mm). The inner circumferential membrane (14), barely visible in this view, may itself be constituted of a single or several elementary inner circumferential membrane(s), for example numbering two (for example each having an axial width equal to 80 mm) or four (for example each having an axial width equal to 40 mm).

The elementary shear bands are placed here circumferentially relative to one another in such a way that their connection cylinders (15) (axial width equal to 40 mm) are substantially aligned from one elementary shear band to the next, in the axial direction Y. Such a configuration gives the wheel greater axial flexibility and may provide an advantageous decoupling for more effectively "absorbing" an obstacle when rolling. However, according to another possible embodiment, the elementary shear bands could be positioned in such a way that their connection cylinders (15) are positioned in staggered rows in the axial direction Y from one elementary shear band to the next.

A tread, not represented in order to simplify FIGS. 6 to 8, could optionally be added to the wheels described previously, positioned radially on top of the outer circumferential membrane (16) when the latter is not intended for direct contact with the ground during rolling of the non-pneumatic wheel.

This tread may be constituted of materials as diverse as metal (or metal alloys), polymeriz or else hybrid metal/polymer materials. As examples of polymeriz, mention may be made, for example, of polyesters such as PET, PTFE, cellulose, such as rayon, rubbers such as diene rubbers or polyurethanes. For use at very low temperature, a tread made of metal, or made of a polymer other than rubber, is preferred.

According to one preferred embodiment, the tread is present in the form of a three-dimensional woven fabric, especially in the aforementioned materials, the thickness of which is, for example, between 5 and 20 mm. This tread may be fastened to the shear band of the wheel by various fastening means as described above, for example by bonding or bolting, or even using assembly means such as the inserts described previously. According to another possible embodiment, it could be incorporated directly into the outer circumferential membrane (16) during its manufacture.

The invention claimed is:

1. A composite laminated product that forms a deformable cellular structure, comprising:
    an upper band and a lower band, both oriented in the same main direction (X); and
    between the two bands and connecting the latter, a series that extends in the direction X, of cylinders referred to as connection cylinders, said connection cylinders being non-touching in the main direction X, and a generatrix of each cylinder oriented along an axis Y perpendicular to the main direction X,
    wherein said connection cylinders are composite cylinders comprising fibres embedded in a resin matrix,
    wherein the connection cylinders have a diameter D, and an average distance d, measured in the main direction, between two consecutive connection cylinders is such that the ratio d/D is between 0.10 and 0.50.

2. The laminated product according to claim 1, wherein the fibres of the connection cylinders are continuous fibres.

3. The laminated product according to claim 2, wherein the fibres are unidirectional, oriented circumferentially in a plane perpendicular to said axis Y.

4. The laminated product according to claim 1, wherein the fibres of the connection cylinders are glass fibres and/or carbon fibres.

5. The laminated product according to claim 1, wherein the upper and lower bands also comprise fibres embedded in a resin matrix.

6. The laminated product according to claim 5, wherein the fibres of the bands are continuous fibres.

7. The laminated product according to claim 6, wherein the continuous fibres of the bands are unidirectional, oriented parallel to the main direction.

8. The laminated product according to claim 5, wherein the fibres of the bands are glass fibres and/or carbon fibres.

9. The laminated product according to claim 1, wherein the connection cylinders have the diameter D that is substantially constant in a direction normal to the main direction and to said axis, so as to keep the upper and lower bands substantially equidistant.

10. The laminated product according to claim 1, wherein at least a portion the connection cylinders are reinforced by a reinforcing element referred to as a "radial cylinder reinforcement" that passes through the portion of the connection cylinders completely along their diameter, parallel to a radial direction which is perpendicular to the main direction and to said axis.

11. The laminated product according to claim 10, wherein the radial cylinder reinforcement passes completely through, in the radial direction, the connection cylinder so as to be anchored in the upper and lower bands.

12. The laminated product according to claim 10, wherein the radial cylinder reinforcement passes completely through, in the radial direction, the connection cylinder and the upper and lower bands so as to be anchored in intermediate assembly parts that assemble the cylinder with the two bands.

13. The laminated product according to claim 10, wherein the radial cylinder reinforcement comprises unidirectional continuous fibres embedded in a resin matrix.

14. The laminated product according to claim 13, wherein the continuous fibres are glass fibres and/or carbon fibres.

15. The laminated product according to claim 10, wherein the radial cylinder reinforcement is formed by a series of discrete radial reinforcements oriented parallel to the radial direction, said series being aligned along said axis.

16. The laminated product according to claim 15, wherein the discrete radial reinforcements of the connection cylinders consist of monofilaments.

17. The laminated product according to claim 1, wherein the resin is a thermosetting resin.

18. The laminated product according to claim 17, wherein the thermosetting resin is a vinyl ester resin.

19. A finished product comprising a laminated product according to claim 1.

* * * * *